United States Patent [19]

Kubasiak

[11] Patent Number: 4,793,204

[45] Date of Patent: Dec. 27, 1988

[54] TILT AND TELESCOPE STEERING COLUMN HAVING A SINGLE CONTROL

[75] Inventor: Duane T. Kubasiak, Bronson, Mich.

[73] Assignee: Douglas Components Corporation, Bronson, Mich.

[21] Appl. No.: 125,565

[22] Filed: Nov. 25, 1987

[51] Int. Cl.[4] .................... B62D 1/18

[52] U.S. Cl. .................... 74/493; 74/535; 74/540; 280/775

[58] Field of Search .................... 74/493, 535, 540; 280/775

[56] References Cited

U.S. PATENT DOCUMENTS 3,285,090 11/1966 Cranbury .................... 74/493

*Primary Examiner*—Allan D. Herrmann

*Attorney, Agent, or Firm*—Pearne, Gordon, McCoy & Granger

[57] ABSTRACT

A tilt and telescope steering column is disclosed in which a single control member operates the lock and release of a tilt lock mechanism and a telescope lock mechanism. Both lock mechanisms include pivotally mounted pawls having teeth which interfit with teeth on an associated housing assembly to lock the column in its adjusted position. The pawls are movable in opposite directions from their respective locked positions to release positions in which adjustment of the steering column is permitted. A control member is mounted for movement in two directions and operates in one direction to release one lock system and in the opposite direction to release the other lock system. Spring means normally maintain the locking pawls in their locked position and also maintain the control member in its neutral position. In one embodiment, a single spring functions to normally maintain both lock mechanisms in their locked position and also normally maintains the control member in its neutral position. In a second embodiment, the control member provides a shaft on which the pawls are mounted for pivotal movement. A lost motion connection is provided between the control member shaft and the locking pawls so that only one locking system is released at a time.

15 Claims, 8 Drawing Sheets

TILT AND TELESCOPE STEERING COLUMN HAVING A SINGLE CONTROL

BACKGROUND OF THE INVENTION

This invention relates generally to vehicle steering columns, and more particularly to a novel and improved tilt and telescope steering column in which the locking of the tilt structure and the telescoping structure is controlled by a single control member.

PRIOR ART

It is known to provide steering columns that can be adjusted by a telescoping movement, and which can also be adjusted by tilting movement to confortably position the steering wheel for any given driver. It is also known to provide a single lever control to lock the column with respect to both tilt and telescoping movement. Examples of such steering columns are illustrated in U.S. Pat. Nos. 2,903,904; 3,245,282; 3,386,309; and 4,649,769. The structures of such columns tend to be quite complicated and require a large number of component parts. Therefore, their manufacturing costs are relatively high, and maintenance costs are often high.

For example, the steering column disclosed in U.S. Pat. No. 4,649,769 provides sliding latches which operate to lock the column in its adjusted position. Sliding latches require bearing surfaces which are relatively expensive if close tolerances are provided. If close tolerances are not maintained, objectionable looseness exists.

SUMMARY OF THE INVENTION

The present invention provides a novel and improved tilt and telescope steering column having a single control for locking and releasing both the tilt lock and the telescoping lock. A simplified, lowcost, and reliable structure is provided in which a single control lever directly operates separate pivotally mounted locking pawls which, in turn, separately operate to lock the column in the adjusted tilt position and in the adjusted telescoped position. The pivotal mounting of pawls provides a mounting system which can be manufactured to close tolerances at low cost to avoid objectionable looseness in the system, and which provides superior wear characteristics.

With this invention, a driver can position the column, and in turn the steering wheel, in any one of a large number of positions for maximum comfort, and can easily reposition the steering wheel to minimize strain and fatigue.

Two embodiments of this invention are illustrated. In both embodiments, the tilt position lock mechanism provides a toothed sector and a toothed, pivotally mounted pawl which interfit for locking in any one of a plurality of tilt positions. Similarly, a toothed rack and a toothed, pivotally mounted pawl interfit to lock the column in any one of a plurality of telescoped positions.

A single lever is pivoted on the column for limited pivotal movement in both directions from a neutral position. Pivotal movement of the control lever in one direction from the neutral position causes the release of the tilt lock pawl and permits tilt adjustment while the telescope lock remains locked. Pivotal movement from the neutral position in the opposite direction causes release of the telescope lock pawl and permits telescoping adjustment while the tilt lock remains locked. Spring means normally maintain the two pawls in the locked position, and also function to normally maintain the control lever in its neutral position.

In one embodiment, the control lever is pivoted for motion about a first axis, and the two pawls are pivoted for movement about axes contained in planes perpendicular to the first axis. In such embodiment, a single spring operates to normally maintain both pawls in their locked position, and also to maintain the control lever in its neutral position.

In the second embodiment, the pawls are journaled directly on the control lever, and the pawls and control lever all pivot about the same axis.

In both embodiments, a lock system operated by a single lever control is provided with a minimum number of components, and a low-cost, reliable system is provided.

These and other aspects of this invention are illustrated in the accompanying drawings, and are more fully described in the following specification.

DETAILED DESCRIPTION OF THE DRAWINGS

Figure 1:
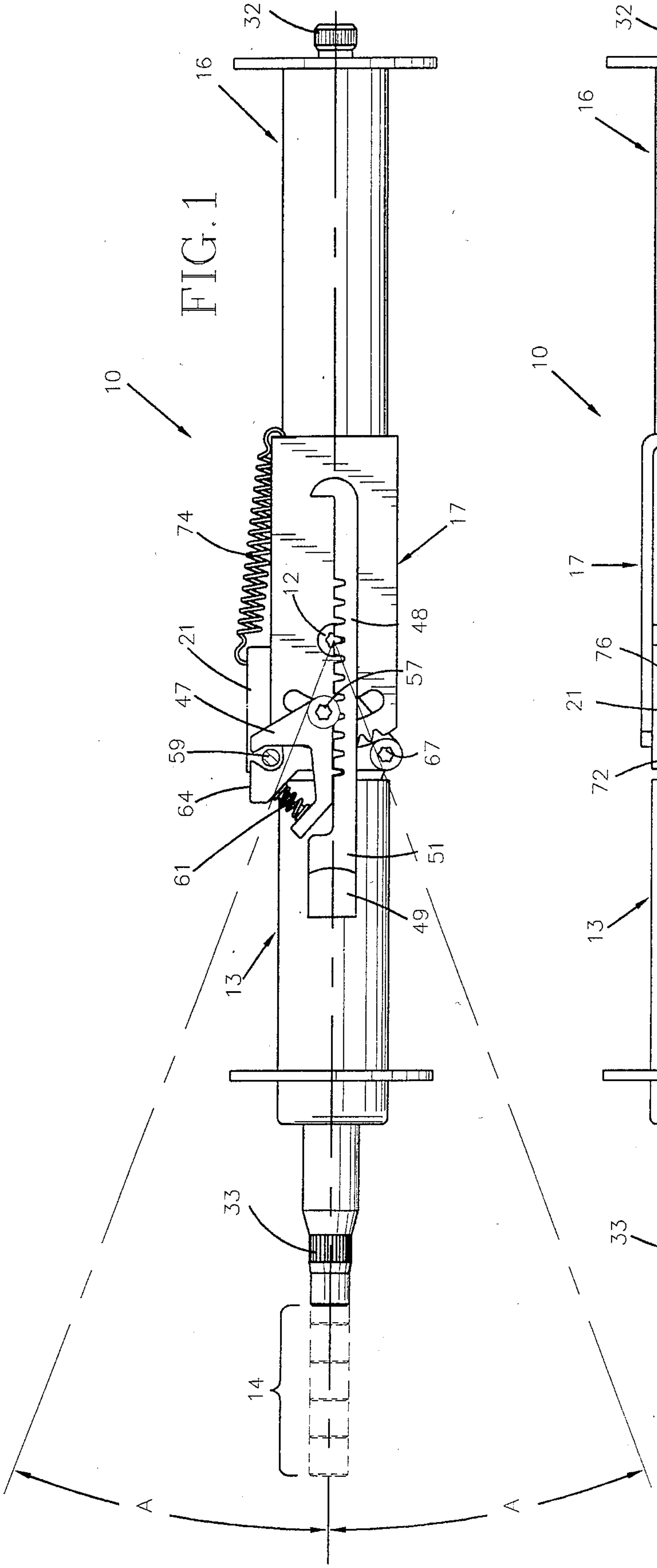
FIG. 1 is a side elevation of a first embodiment of a steering column incorporating the present invention.
Figure 2:
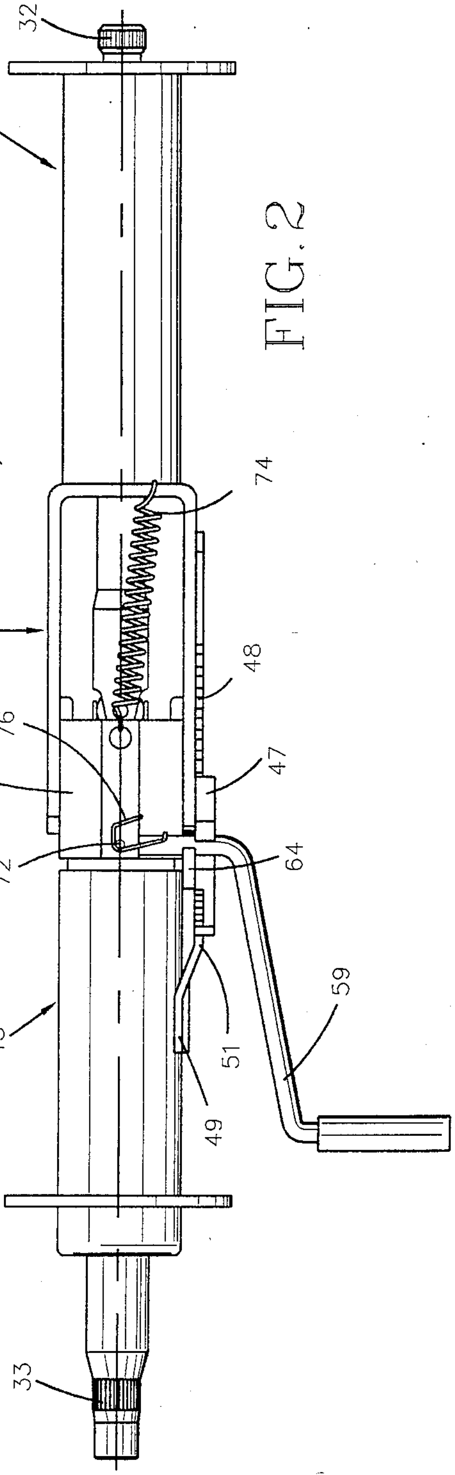
FIG. 2 is a plan view of the steering column illustrated in FIG. 1.

FIGS. 1 through 9 illustrate a first embodiment of this invention, which includes three housing assemblies interconnected to provide both tilting adjustment of the column and longitudinal telescoping adjustment of the column. A first housing assembly 10 is mounted on the vehicle and is pivotally connected to a second housing assembly 11 by a pivot 12. This pivot permits pivotal movement of the second housing assembly 11 relative to the first housing assembly 10 through an angle A in both directions from the aligned position illustrated in the drawings.

A third housing assembly 13 is mounted on the second housing assembly 11 for longitudinal telescoping movement relative thereto between the retracted position illustrated in the drawings and a plurality of extended positions illustrated in phantom within the bracket 14. In the illustrated embodiment, the third housing assembly can be locked in any one of eleven positions of extension, as discussed in detail below. Further, the second housing assembly 11, and in turn the third housing assembly 13, can be locked in any one of seven tilt positions, with three tilt positions provided on each side of the straight positions. Here again, the manner in which the tilting lock functions is described in detail below.

Figure 8:
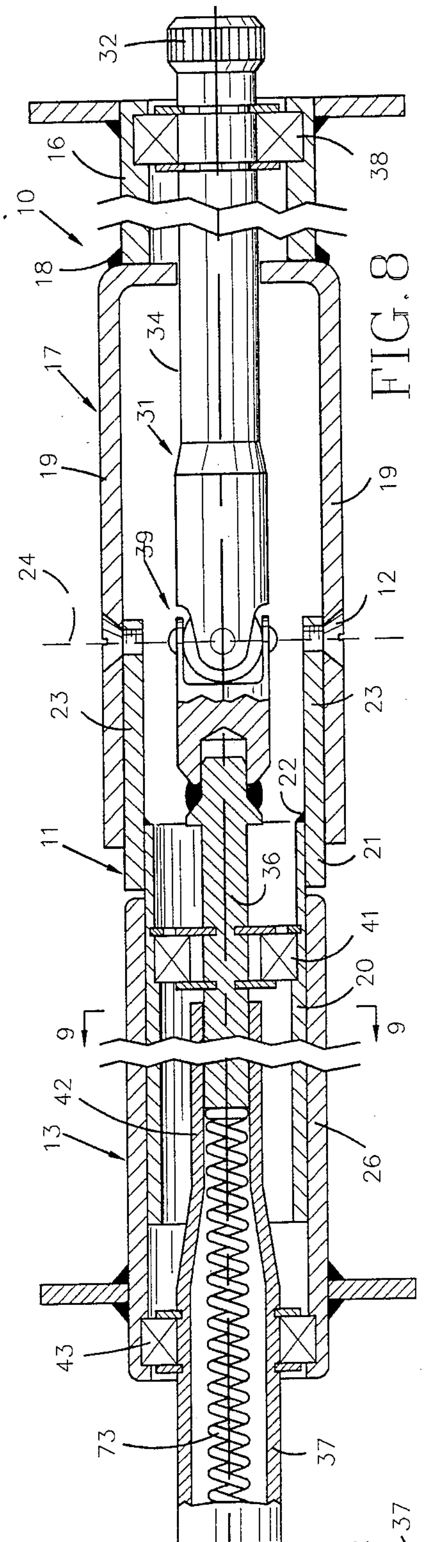
FIG. 8 is a schematic, longitudinal section of the steering column, with parts removed for purposes of clarity and illustrating the internal components of the steering column.

FIG. 8 schematically illustrates the internal structure of the steering column. The first housing assembly 10 includes a tubular member 16 having a trunnion 17 mounted thereon by a weld 18. The trunnion 17 provides opposed, longitudinally extending side portions 19.

The second housing assembly 11 also provides a tubular member 20 having a bracket 21 secured thereto by a weld 22. The bracket 21 provides a pair of longitudinally extending, parallel sides 23 which extend along the inner sides of the associated side portions 19 of the trunnion 17 and are connected by the pivots 12 for relative rotation about a lateral tilt pivot axis 24.

The tubular member 20 of the second housing assembly extends into a tubular member 26 which is part of the third housing assembly 13. A relatively close fit is provided between the two tubular members 20 and 26 so that they are maintained in axial alignment but they are free to telescope axially relative to each other.

Extending through the three housing assemblies is a steering shaft system 31 which is adapted at one end 32 to be connected to the vehicle steering linkage and is adapted at its other end 33 for the mounting of a steering wheel (not illustrated).

The shaft system 31 includes three shaft members 34, 36, and 37. The shaft member 34 is journaled adjacent to its end 32 in a bearing 38 mounted at the end of the tubular member 16 and extends along the tubular member 16 into the trunnion 17. A universal joint 39 having an operating axis coaxial with the pivot axis 24 connects the inner end of the shaft member 34 to the shaft member 36.

The shaft member 36, in turn, extends from the universal joint 39 along the tubular member 20, and is axially and laterally fixed therein by the bearings 41. The shaft member 36 is provided with a non-circular, double D-shape, best illustrated in FIG. 9, and extends into the inner end 42 of the third shaft member 17.

Figure 9:
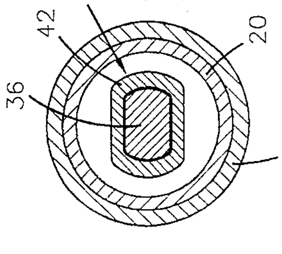
FIG. 9 is a cross section, taken along line 9—9 of FIG. 8.

The inner end of the shaft member 37 is also formed with a non-circular double D shape, best illustrated in FIG. 9, and closely fits the periphery of the shaft member 36. Therefore, the two shaft members 36 and 37 are locked against relative rotation, although they are free to move axially relative to each other with telescoping movement. A third bearing 43 journals the shaft member 37 at the outer end of the tubular member 26 and prevents relative axial movement therebetween while permitting relative rotation therebetween.

When it is desired to tilt the end 33 of the column to position the steering wheel at various vertical locations, the tilt lock system (described in detail below) is released and the housing assembly 11, and in turn the housing assembly 13, along with the two shafts 36 and 37, are pivoted about the axis 24 to the desired adjusted position, and then locked in such adjusted position by the tilt lock mechanism. Because the universal joint 39 is aligned with the pivot axis 24, the operation of the shaft system is not affected by the tilt adjustment.

Similarly, when it is desired to telescope the column for changing the longitudinal length of the column, a telescope lock mechanism (described in detail below) is released and the third housing assembly 13, along with the shaft member 37, is free for movement longitudinally to the desired adjusted position and is then locked by the telescope lock mechanism in the adjusted telescoped position.

Figure 3:
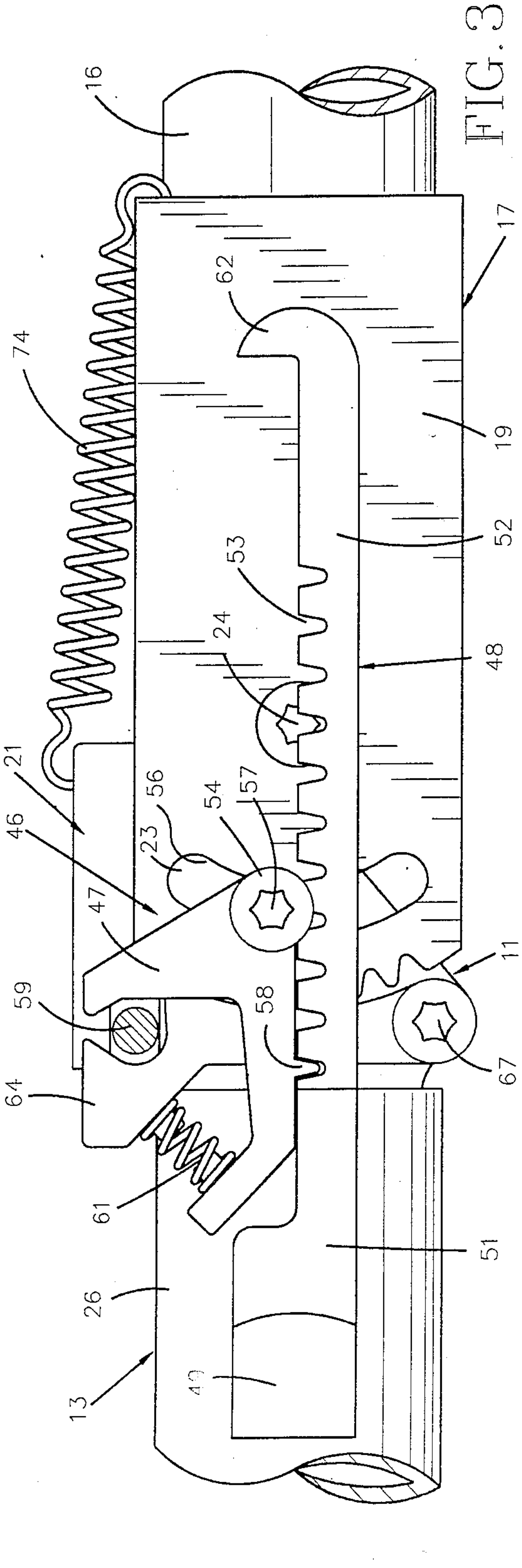
FIG. 3 is an enlarged, fragmentary side elevation, illustrating the locking pawls in their locked position.
Figure 4:
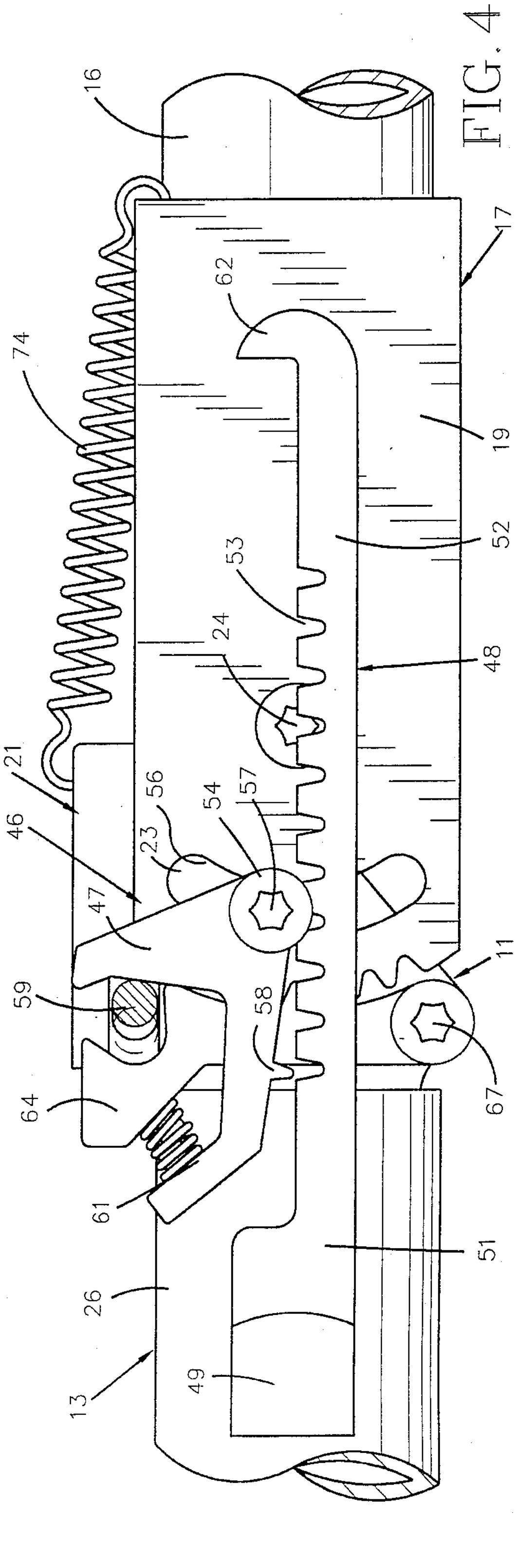
FIG. 4 is an enlarged, fragmentary view, similar to FIG. 3, but illustrating the telescope locking pawl in its released position, in which telescoping movement of the column is permitted.

The telescope lock mechanism 46 is best illustrated in FIGS. 3 and 4, and includes a telescope lock pawl 47 and a toothed rack 48. The toothed rack 48 is welded to one side of the tubular member 26 at 49, and provides an offset 51, best illustrated in FIG. 7, from which a toothed rack portion 52 extends along the side of one of the side portions 19 of the trunnion 17. The toothed rack portion 52 is provided with longitudinally spaced teeth 53 along its length. In the illustrated embodiment, there are eleven teeth 53, permitting the steering column to be locked in any one of eleven telescoped positions.

The telescope lock pawl 47 is mounted on the bracket 21 by a pivot screw 54 which extends through an arcuate slot 56 formed in the adjacent side portion 19 of the trunnion 17 and is threaded into the adjacent side 23 of the bracket 21. This pivotal mounting of the telescope pawl 47 permits pivotal movement of the pawl about a pivot axis 57, which is spaced from the pivot axis 24, and, in the illustrated embodiment, is parallel thereto.

The telescope lock pawl 47 is provided with a tooth 58, sized and shaped to mate with any one of the teeth 53 on the rack 48, and, when the pawl is in the locked position of FIG. 3, prevents relative axial telescoping movement between the second housing 11 and the third housing 13. However, when the pawl 47 is pivoted clockwise from the position of FIG. 3 to the position of FIG. 4, the tooth 58 is lifted clear of the rack 48 and the column is free to be telescoped in or out to any desired adjusted position. After adjustment, the pawl 47 returns to the locked position and maintains the column in the adjusted position.

Movement of the telescope lock pawl 47 from its locked position of FIG. 3 to its released position of FIG. 4 is provided by a control lever 59, as discussed below, and a spring 61 which engages the pawl 47 at one end functions to return the pawl to its locked position after telescoping adjustment is completed.

The toothed rack 48 is provided with a lateral projection 62 which engages the pawl 47 adjacent to the pivot member 54 to limit extension of the steering column. Inward telescoping movmement is limited by engagement between the inner end of the tubular member 26 and the bracket 21. The rack 48 also prevents rotation of the third housing assembly 13 relative to the second housing assembly 11.

Figure 5:
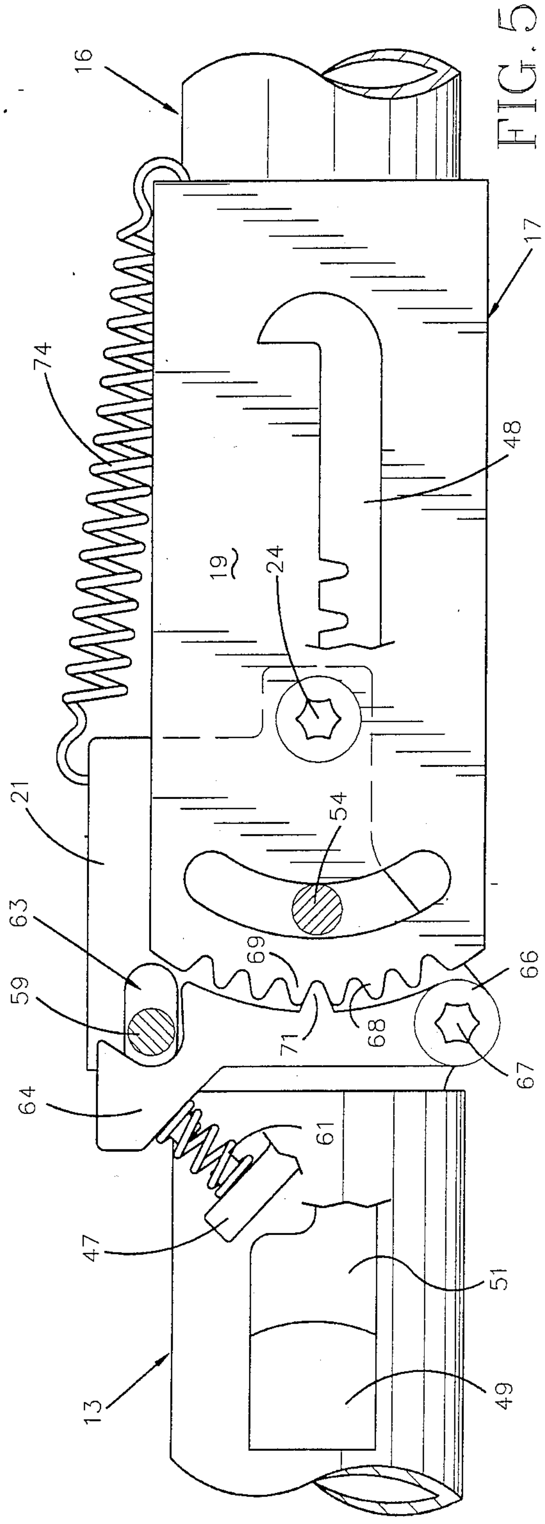
FIG. 5 is an enlarged, fragmentary section similar to FIGS. 3 and 4, with the telescope locking structure removed so as to illustrate the tilt lock structure in its locked position.
Figure 6:
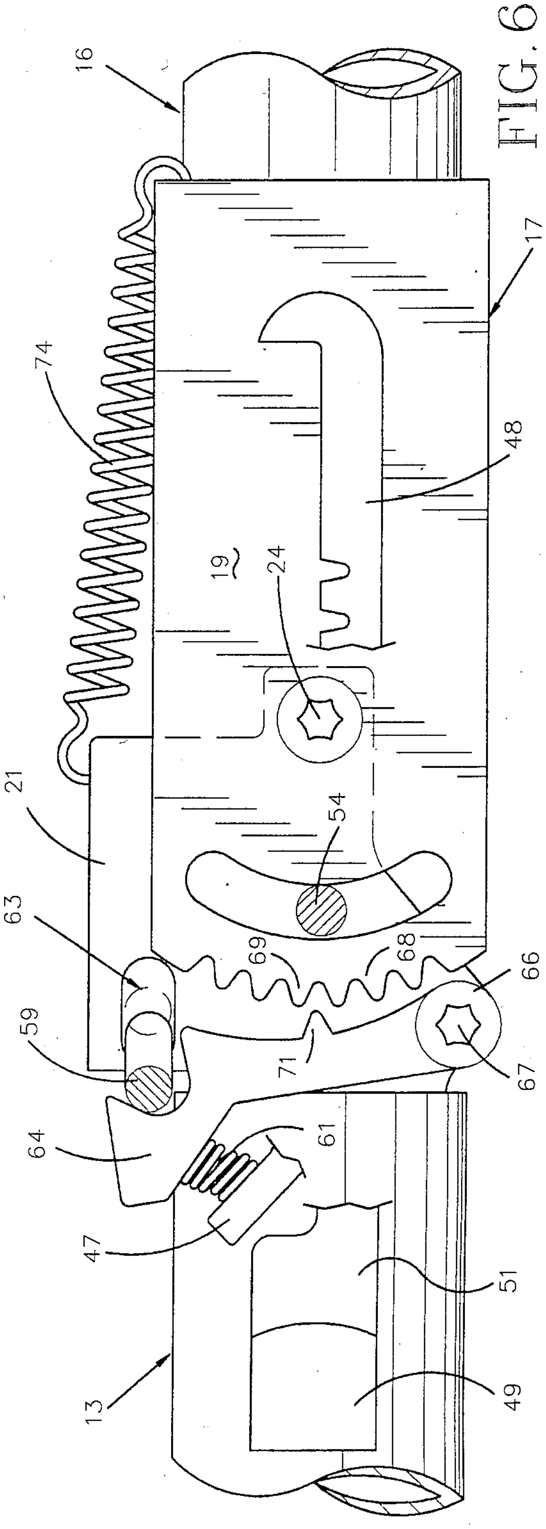
FIG. 6 is an enlarged, fragmentary, section similar to FIG. 5, illustrating the tilt lock pawl in its released position, in which tilt adjustment of the steering column is permitted.

A tilt lock mechanism 63 is best illustrated in FIGS. 5 and 6, and includes a tilt lock pawl 64. The pawl 64 is pivotally mounted on the bracket 21 by a pivot screw 66 for limited pivotal movement about a pivot axis 67. The end of the adjacent side portion 19 of the trunnion is provided with a toothed sector 68 having a plurality of teeth 69 equally spaced from the tilt pivot axis 24 and radially positioned with respect to such axis. In the illustrated embodiment, the teeth 69 provide seven tilt positions in which the tilt lock mechanism 63 can lock the column.

The tilt lock pawl 64 is provided with a tooth 71 sized to interfit and mate with the teeth 69 when the pawl is in the tilt lock position of FIG. 5 and which is moved clear of the tooth sector 68 when it is pivoted in an anticlockwise direction to the position of FIG. 6. Here again, the movement of the tilt lock pawl between the locked position of FIG. 5 and the release position of FIG. 6 is provided by the control lever 59, as discussed below. Further, the spring 61, which extends between the pawl 64 and the pawl 47, operates to return the tilt lock pawl to its locked position of FIG. 5 when the control lever 59 is released.

The pivot fastener 54, which extends through the arcuate slot 56, functions to limit the amount of tilt movement in both directions from the neutral position illustrated.

Figure 7:
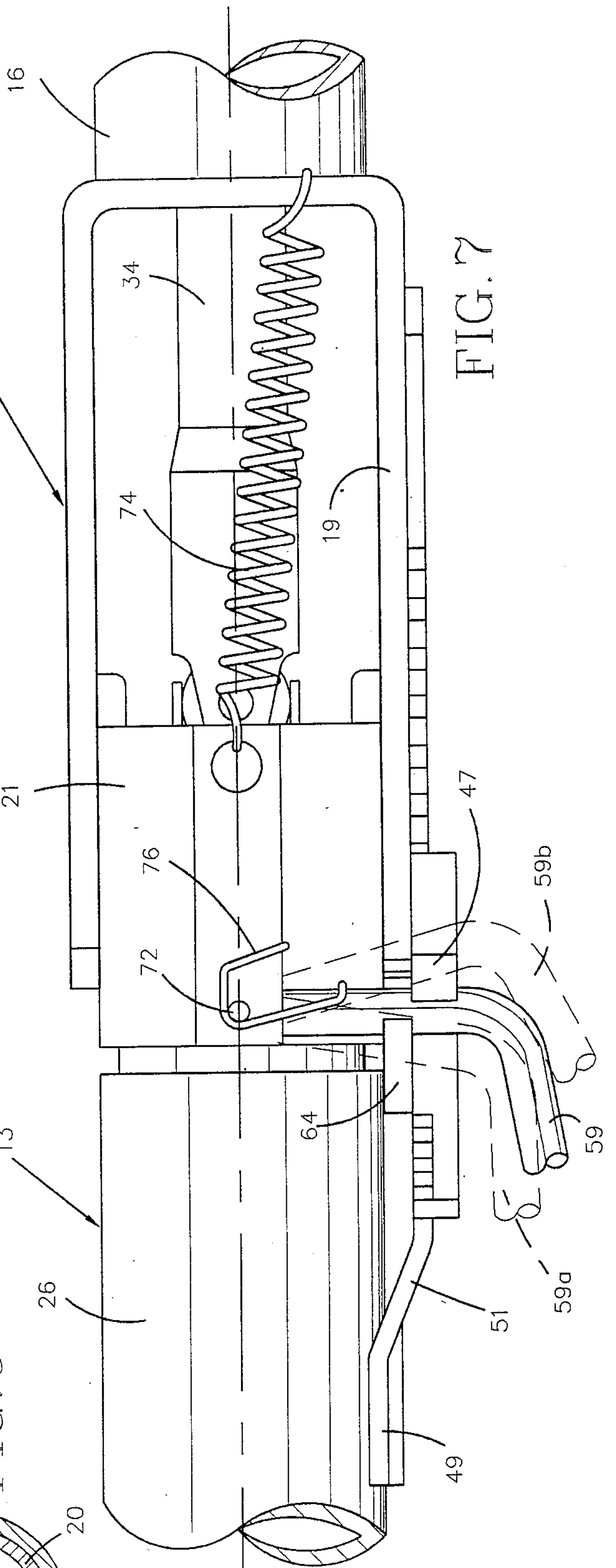
FIG. 7 is an enlarged, fragmentary plan view illustrating the mounting of the control lever.
Figure 10:
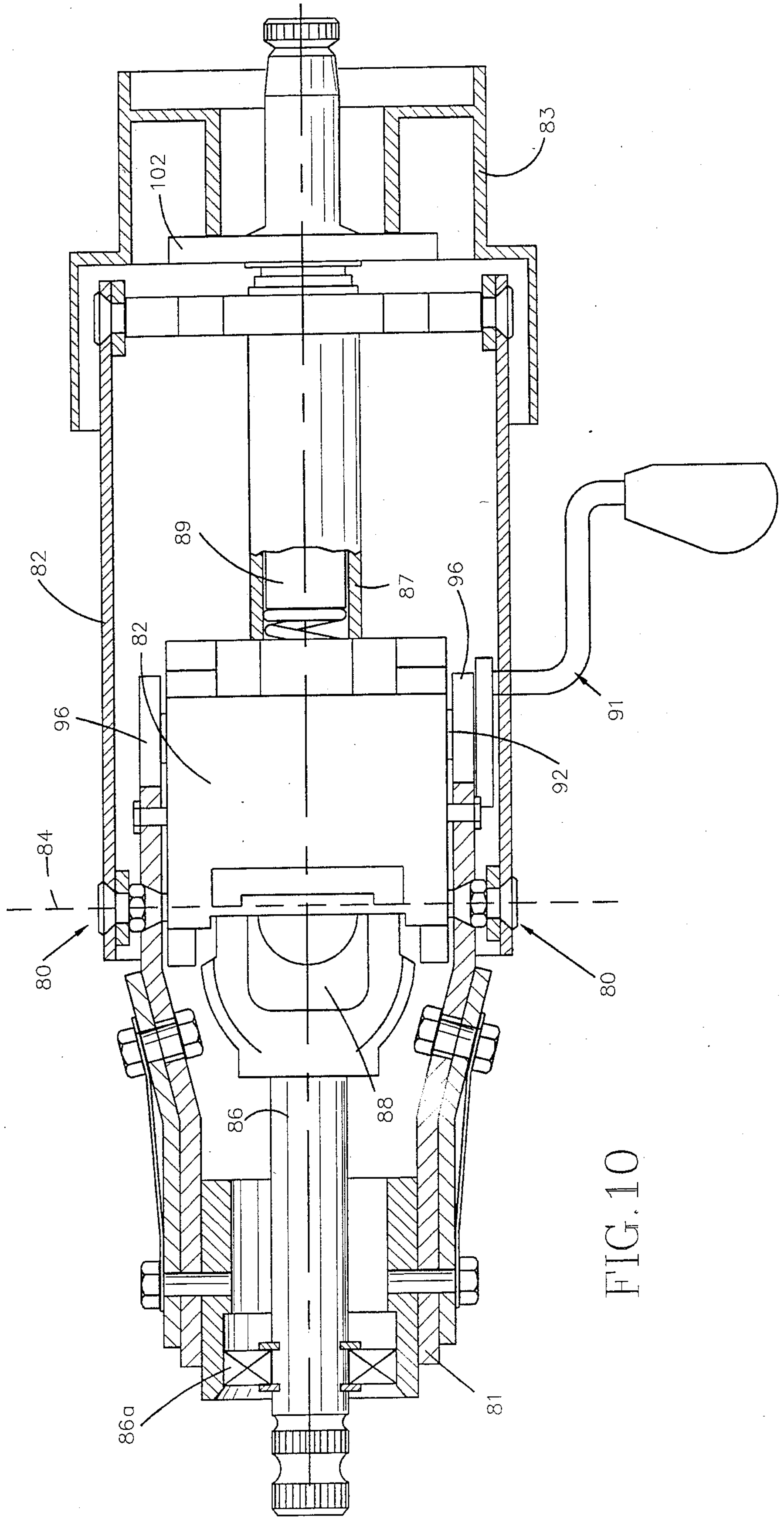
FIG. 10 is a plan view, partially in section, of a second embodiment of this invention.

The control lever 59 is pivoted on the bracket 21 by a pivot pin 72, as illustrated in FIG. 7, and extends laterally between the two pawls 47 and 64. When the control lever 59 is pivoted in a clockwise direction from its neutral position illustrated in FIG. 7 to the phantom position 59*a*, it engages the tilt lock pawl and moves it to the release position. Such movement, however, has no effect on the telescope lock pawl 47, and therefore the column remains locked against telescoping movement during tilt adjustment.

Conversely, when the control lever is rotated about the pivot 72 in the opposite direction to the phantom line position 59*b*, it engages the telescope lock pawl 47 and moves such pawl to its release position, allowing telescope adjustment of the column. In such position 59*b*, however, the tilt lock pawl 64 remains in the locked position, so the column is locked against tilting adjustment while telescope adjustment is taking place.

A compression spring 73 positioned within the tubular shaft member 37 engages the end of the shaft member 36 and provides a resilient force urging the column toward the maximum extended position so that the column moves to such extended position without effort on the part of the operator when the telescope lock pawl is released. When inward telescoping movement is desired, the vehicle operator merely releases the telescope lock pawl by moving the control lever 59 to the position 59*b* and presses inwardly on the steering wheel until the desired telescope lock position is reached. Release of the control lever relocks the telescope lock pawl 47 and locks the column in the adjusted telescope position.

A tension spring 74 is connected between the trunnion 17 and the bracket 21, and resiliently urges the column toward the maximum up-tilt position. Here again, when tilt position is being adjusted, the vehicle operator merely releases the tilt lock mechanism 63 and presses downwardly on the steering wheel until the desired tilt position is reached, after which the control lever 59 is released and the tilt lock mechanism reengages to lock the column in the adjusted tilt position.

In this embodiment, the single spring 61 serves three functions: it biases the telescope lock pawl 47 to its normal locked position; it biases the tilt lock pawl 64 toward its normal locked position; and it also normally maintains the control lever 59 in the neutral position in which both lock mechanisms remain locked. A light spring 76, however, is preferably provided to apply a light clockwise bias to the control lever 59 to prevent rattle. However, such spring 76 is not sufficiently strong to overcome the action of the spring 61 in maintaining the tilt lock pawl in its locked position.

FIGS. 10 through 13 illustrate a second embodiment of a tilt and telescope steering column in accordance with this invention. In this embodiment, the column again provides three housing assemblies 81, 82, and 83, which for purposes of illustration are schematically illustrated. The housing assembly 82 includes an inner housing part interconnected to an outer housing part. The housing assembly 81 is fixed to the vehicle to provide the support for the steering column. The housing assembly 82 is pivotally mounted on the housing assembly 81 by a pivot 80 including a male pivot part mounted on the housing 82 and an opening in the housing 81 for pivotal movement about a pivot axis 84. Such pivot permits the tilting of the housing assembly 82 with respect to the housing assembly 81. The housing 81 is formed with arcuate slots 81*a* through which a pin 82*a* on the housing 82 extends to limit the pivotal movement between the two housings 81 and 82. The housing assembly 83 is longitudinally movable relative to the housing assembly 82 to provide the telescoping adjustment of the steering column.

The shaft system again provides two shafts 86 and 87 connected by a universal joint 88 having an operating axis coaxial with the pivot axis 84. The shaft 86 is journaled in a bearing 86a in the housing 81. A third shaft 89 telescopes into the shaft 87 and is axially movable relative to the shaft 87 during the telescoping adjustment. Here again, a non-circular configuration is provided in both of the shafts 87 and 89, as illustrated in FIG. 9 of the first embodiment, so that they are fixed against relative rotation but are axially movable relative to each other.

Figure 11:
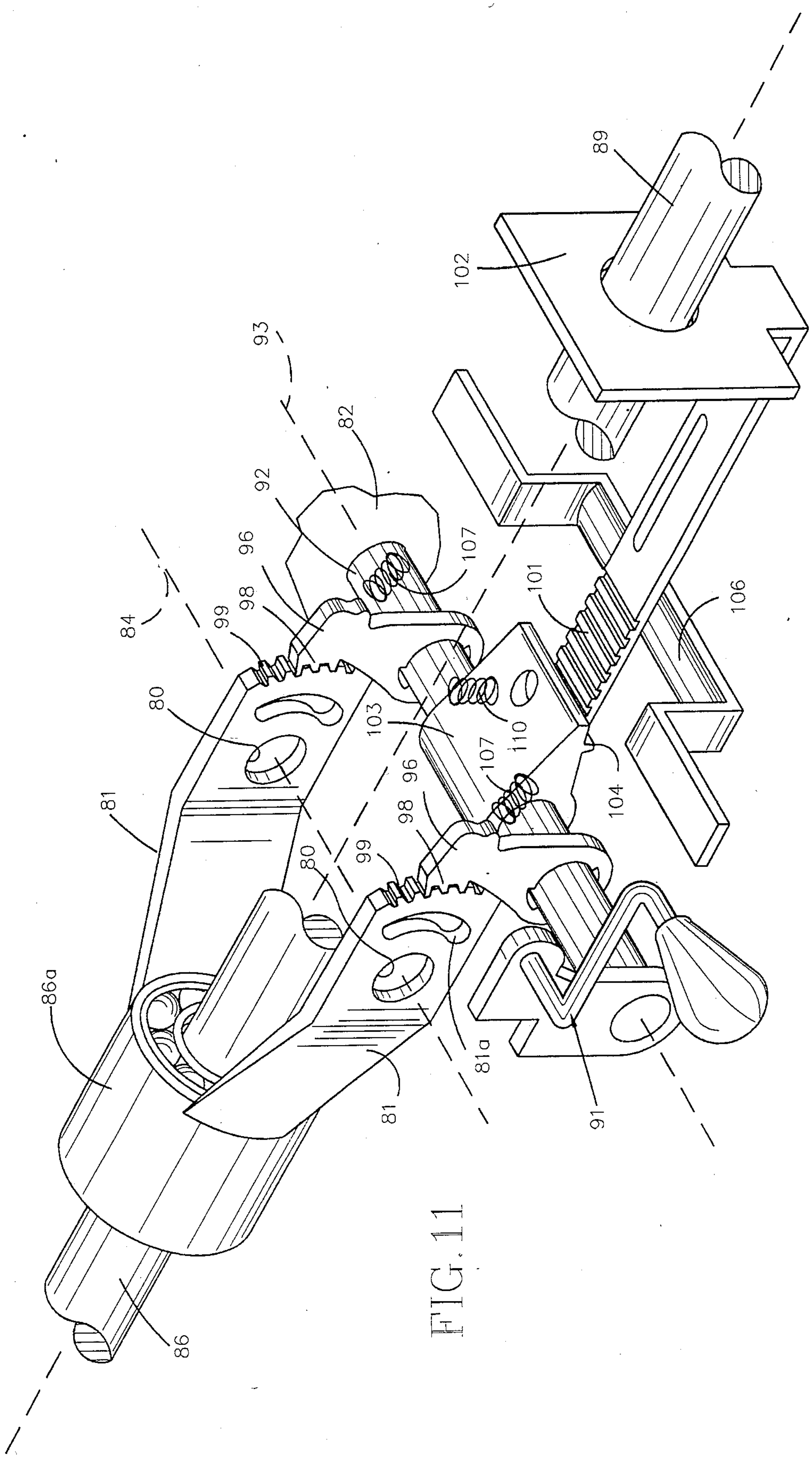
FIG. 11 is a schematic, perspective view illustrating the general arrangement of the lock mechanism of the second embodiment.

The locking system for both the tilt lock and the telescoping lock is best illustrated in the schematic perspective view of FIG. 11. A control lever assembly 91 includes a shaft 92 journaled on the housing assembly 82 for oscillating rotation about a pivot axis 93 which is spaced from and parallel to the main pivot axis 84. The tilt lock includes a pair of laterally spaced pawls 96 which are mounted on the shaft 92 on opposite sides of the steering column. Each of the pawls 96 is provided with teeth 98 which interfit with teeth 99 formed in the end of the first housing 81 to prevent tilting movement of the second housing assembly 82 about the pivot axis 84 when the pawls 96 and 97 are in the locked position illustrated in FIG. 11.

Figure 12:
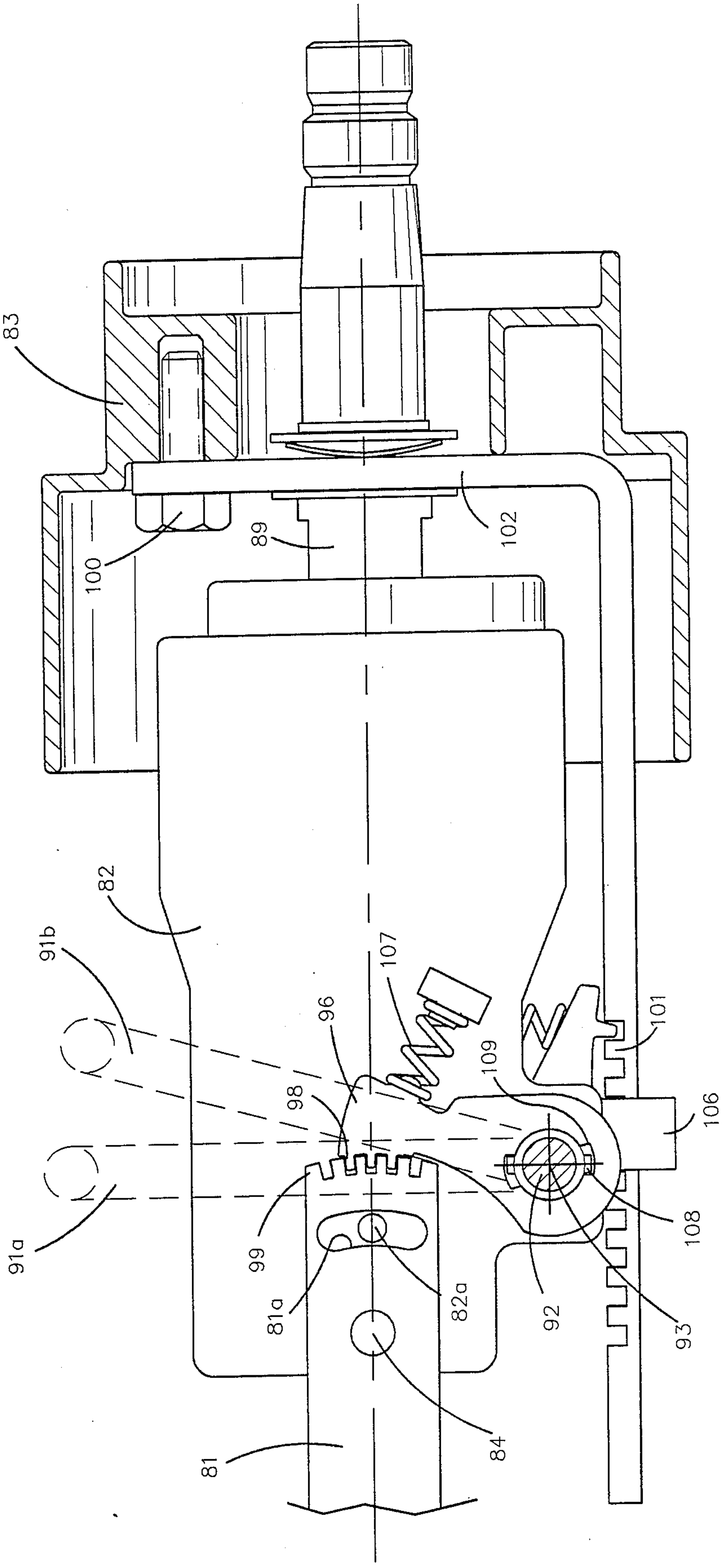
FIG. 12 is a fragmentary side elevation illustrating the tilt lock mechanism.
Figure 13:
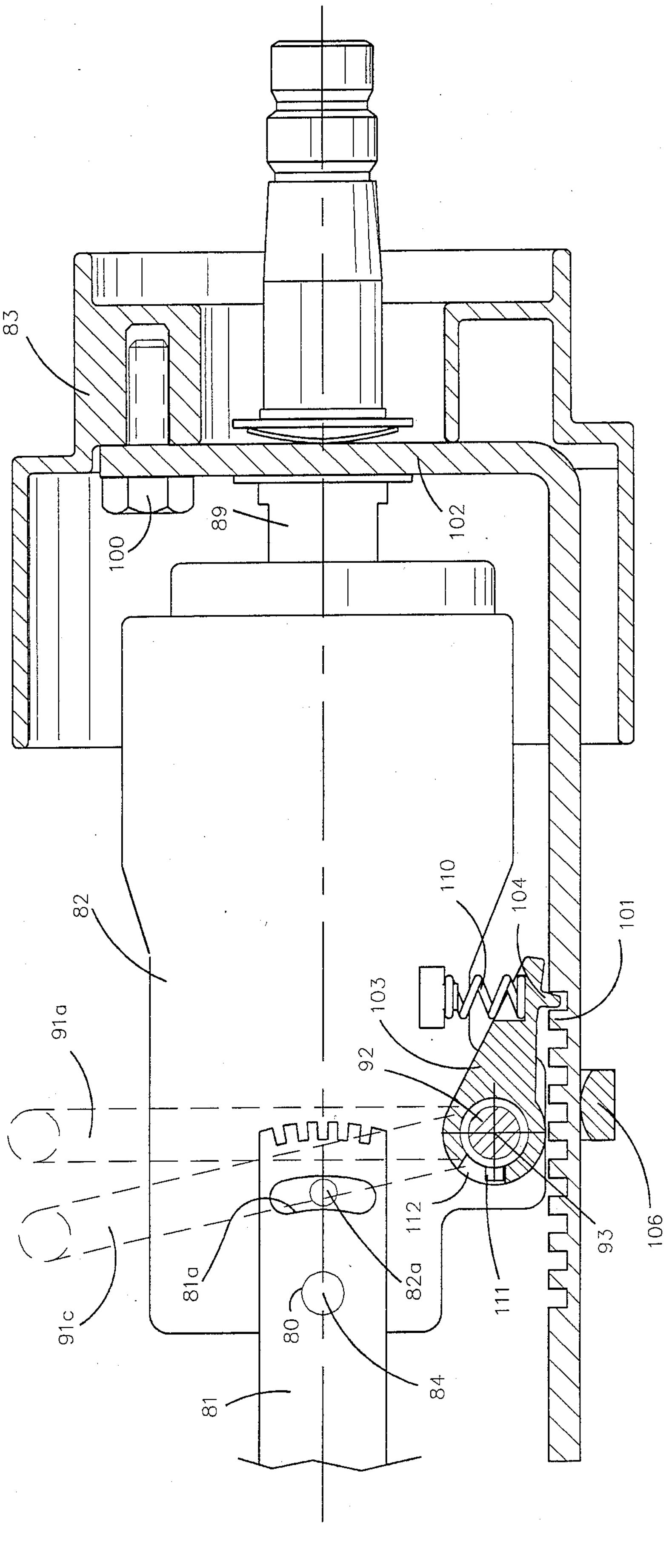
FIG. 13 is a fragmentary side elevation, with parts removed, illustrating the tilt lock mechanism.

The telescoping lock system includes a toothed rack 101 which is provided with a lateral portion 102 mounted on the third housing assembly 83 by fasteners 100 illustrated in FIGS. 12 and 13. In addition, the lateral portion 102 is also connected to the third shaft 89 and locked against relative axial movement while permitting relative rotation therebetween.

A telescope lock pawl 103 is also mounted on the shaft 92 for limited pivotal movement relative thereto, and is provided with a tooth 104 which interfits with the teeth formed in the rack 101 to lock the rack against axial movement when in the locked position illustrated in FIG. 11. A strap 106 mounted on the second housing assembly 82 supports the side of the rack 101 opposite the pawl 103 and prevents lateral movement of the rack away from the pawl while permitting axial movement of the rack with respect to the pawl during the telescoping adjustment of the column. Here again, the rack 101 prevents relative rotation between the two housing assemblies 82 and 83.

The locking and release movement of the pawl 96 is best illustrated in FIG. 12, in which the pawl 96 is illustrated in its locked position in which its teeth 98 engage the teeth 99. A spring 107 associated with the pawl 96 normally maintains the associated pawl in its locked position.

A cross-pin 108 is mounted on the shaft 92 and extends beyond the periphery thereof at both ends into associated slots 109 formed in the associated pawl 96. The slots are sized and positioned with respect to the pin so that when the control lever 91 is in its neutral position 91*a*, as illustrated in FIG. 12, the spring 107 maintains the two pawls in their locked position. However, when the control lever is moved in a clockwise direction, as illustrated in FIG. 12, to the phantom position 91*b*, the pins 108 associated with the pawls engage the end of the associated slots 109 and cause the two pawls to rotate in a clockwise direction, lifting the teeth 98 of the pawls away from the teeth 99 on the first housing assembly 81 so that the column is released for tilting adjustment. When the operator has tilted the column to the desired position, the control lever is released, and the springs 107 return the two pawls to the locked condition and lock the column in the desired adjusted tilt position.

A similar structure is provided for causing the control lever 91 to release the telescope lock pawl 103. The telescope lock pawl is normally maintained in the locked position illustrated in FIG. 13 by a spring 110. Here again, a pin 111 is mounted in the shaft 92 and extends into an opening 112 formed in the pawl 103. This opening 112 is sized and positioned with respect to the pin 111 so that clockwise rotation of the shaft 92 to release the tilt lock pawls 96 and 97 does not cause movement of the telescope lock pawl 103. However, anticlockwise rotation from the control lever position 91*a*, illustrated in phantom in FIG. 13, to the phantom position 91*c* causes the pin 111 to rotate the telescope lock pawl against the action of the spring 110 to lift the tooth 104 formed therein out of the associated tooth in the rack 101. The column is then free for telescoping adjustment. Once the operator has moved the column to the desired telescoped position, the control lever 91 is again released and the spring 110 returns the telescope lock pawl 103 to its locked position.

Here again, the springs 107 and 110 which normally maintain the associated pawls in their locked position operate to normally maintain the control lever 91 in its neutral position. Further, when the column is released for tilting adjustment, the telescoping lock mechanism remains locked. Conversely, when the telescoping lock system is released for telescoping adjustment, the tilt lock remains locked.

With both embodiments of this invention, a structurally simple locking system is provided to provide a reliable, easily operated mechanism. Further, the number of component parts required to provide the locking and release mechanisms is minimized so that manufacturing costs and maintenance costs are also minimized.

Although the preferred embodiments of this invention have been shown and described, it should be understood that various modifications and rearrangements of the parts may be resorted to without departing from the scope of the invention as disclosed and claimed herein.

What is claimed is:

1. An elongated adjustable steering column comprising first and second housing assemblies pivoted together for tilt adjustment, a third housing assembly mounted on said second housing assembly for telescoping movement relative thereto, a telescope lock pawl and a tilt lock pawl both pivoted on said second housing member for oscillating movement between a locked position in which they lock the housings against adjustment and a release position respectively permitting telescoping adjustment and tilt adjustment, a control member movable in two directions from a neutral position, movement of said control member from said neutral position in one direction causing engagement and movement of the telescope lock pawl to its release position and in the other direction causing engagement and movement of said tilt lock pawl to its release position, and spring means normally maintaining said pawls in their locked positions.

2. An adjustable steering column as set forth in claim 1, wherein said spring means operates through said pawls to maintain said control member in its neutral position.

3. An adjustable steering column as set forth in claim 1, wherein said spring means provides a single spring normally maintaining said pawls in their locked positions and normally maintaining said control member in its neutral position.

4. An adjustable steering column as set forth in claim 1, wherein one of said pawls is mounted on said second housing assembly by a pivot which also limits the tilting movement of said column.

5. An adjustable steering column as set forth in claim 4, wherein said third assembly provides a toothed rack which cooperates with said telescope pawl to lock said third housing assembly in one of a plurality of telescoped positions and also prevents rotation of said third housing assembly relative to said second housing assembly.

6. An adjustable steering column as set forth in claim 5, wherein said toothed rack limits the extension of said steering column.

7. An adjustable steering column as set forth in claim 1, wherein said control member includes a shaft journaled on said second housing assembly, and said pawls are journaled on said shaft.

8. An adjustable steering column as set forth in claim 7, wherein a lost motion connection is provided between said shaft and each of said pawls.

9. An adjustable steering column as set forth in claim 8, wherein each lost motion connection includes a projection on said shaft positioned to engage a surface on each associated pawl and provide a driving connection in response to movement of said shaft in one direction.

10. An elongated adjustable steering column comprising first and second housing assemblies pivoted for tilt adjustment about a tilt axis, a third housing assembly mounted for telescoping movement relative to said second housing assembly, a tilt lock pawl pivoted on said second housing assembly for movement between a locked position and a release position, said first housing assembly providing a plurality of teeth, said tilt lock pawl providing a projection operable to interfit with said first housing assembly teeth to lock said first and second housing assemblies in one of a plurality of tilt positions when said tilt lock pawl is in said locked position, said third housing assembly providing a plurality of longitudinally spaced teeth, a telescope lock pawl pivoted on said second housing assembly for movement between a locked position and a release position, said telescope lock pawl providing a projection interfitting with said third housing assembly teeth and locking said second and third housing assemblies in one of a plurality of telescoped positions when said telescope lock pawl is in its locked position, and a control member mounted on said second housing member for motion in two directions from a neutral position, movement of said control member from its neutral position in one direction causing said control member to engage and move said tilt lock pawl to its release position, movement of said control member from its neutral position in the other direction causing said control member to engage and move said telescope lock pawl to its release position.

11. An adjustable steering column as set forth in claim 10, wherein a single spring acts between said telescope lock pawl and said tilt lock pawl normally maintaining said pawls in their locked position.

12. A steering column as set forth in claim 11, wherein said pawls operate to maintain said control member in said neutral position when said pawls are in their locked position.

13. An adjustable steering column as set forth in claim 10, wherein said control member provides a shaft pivoted on said second housing assembly, and said pawls are journaled on said shaft.

14. An adjustable steering column as set forth in claim 10, wherein said third housing assembly teeth are provided by a rack which also prevents relative rotation between said third housing assembly and said second housing assembly.

15. An elongated adjustable steering column comprising a first housing assembly, a second housing assembly pivotally connected to said first housing assembly for tilting movement relative to said first housing assembly about a tilt axis, a third housing assembly mounted on said second housing assembly for longitudinal telescoping movement along a telescoping axis perpendicular to a plane containing said tilt axis, a tilt lock pawl pivoted on said second housing for pivotal movement about an axis spaced from said tilt axis between a locked position and a release position, said tilt lock pawl and said first housing assembly providing interfitting surfaces that lock said second housing in one of a plurality of tilt positions when said tilt lock pawl is in said locked position and permitting relative tilt movement between said first and second housing assemblies when said tilt lock pawl moves to said release position, a telescoping lock pawl pivoted on said second housing assembly for pivotal movement between a locked position and a release position, said third housing assembly and said telescope lock pawl providing interfitting surfaces preventing telescoping movement between said second and third housing assemblies when said telescope lock pawl is in said locked position and permitting telescoping relative movement when said telescope lock pawl is in said release position, a control member movable in two directions from a neutral position, said control member engaging said tilt lock pawl and moving said tilt lock pawl to its release position in response to movement of said control member from said neutral position in a first of said two directions, said control member engaging said telescope lock pawl and moving said telescope lock pawl to its release position in response to movement of said control member from said neutral position in the other of said two directions.

* * * * *

UNITED STATES PATENT AND TRADEMARK OFFICE

CERTIFICATE OF CORRECTION

PATENT NO. : 4,793,204

DATED : December 27, 1988

INVENTOR(S) : Duane T. Kubasiak

It is certified that error appears in the above-identified patent and that said Letters Patent is hereby corrected as shown below:

Cover Page: Under "References Cited" add the following references listed on PTO-1449, dated Nov. 25, 1987:

| | | | |
|---|---|---|---|
| --2,903,904 | 9/1959 | Mackie | 74/493 |
| 3,245,282 | 4/1966 | Kimberlin | 74/493 |
| 3,386,309 | 6/1968 | Reed et al. | 74/493 |
| 4,649,769 | 3/1987 | Venable | 74/493-- |

Column 1, line 16, "confortably" should be --comfortably--; and line 37, "lowcost" should be --low cost--.

Column 3, line 54, "17" should be --37--.

Column 8, line 33, "third assembly" should be --third housing assembly--.

Signed and Sealed this

Twenty-ninth Day of August, 1989

Attest:

DONALD J. QUIGG

*Attesting Officer*

*Commissioner of Patents and Trademarks*